United States Patent
Togano et al.

(10) Patent No.: US 7,733,323 B2
(45) Date of Patent: Jun. 8, 2010

(54) DISPLAY APPARATUS

(75) Inventors: Takeshi Togano, Chigasaki (JP); Tsutomu Ikeda, Hachioji (JP); Nobutaka Ukigaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 10/542,002

(22) PCT Filed: Apr. 21, 2004

(86) PCT No.: PCT/JP2004/005737

§ 371 (c)(1),
(2), (4) Date: Jul. 12, 2005

(87) PCT Pub. No.: WO2004/095122

PCT Pub. Date: Nov. 4, 2004

(65) Prior Publication Data

US 2006/0125776 A1 Jun. 15, 2006

(30) Foreign Application Priority Data

Apr. 21, 2003 (JP) ............... 2003-115959
Apr. 16, 2004 (JP) ............... 2004-121777

(51) Int. Cl.
G09G 3/34 (2006.01)
(52) U.S. Cl. .................. 345/107; 359/296
(58) Field of Classification Search ........... 345/107; 359/296, 240
See application file for complete search history.

(56) References Cited

U.S. PATENT DOCUMENTS

| | | | |
|---|---|---|---|
| 6,221,267 B1 | 4/2001 | Ikeda et al. | 216/24 |
| 6,239,896 B1 * | 5/2001 | Ikeda | 359/240 |
| 6,292,238 B1 * | 9/2001 | Okada et al. | 349/58 |
| 6,490,095 B2 * | 12/2002 | Okuyama et al. | 359/631 |
| 6,639,580 B1 * | 10/2003 | Kishi et al. | 345/107 |
| 6,741,385 B2 | 5/2004 | Ikeda et al. | 359/296 |
| 6,822,783 B2 | 11/2004 | Matsuda et al. | 359/296 |
| 6,897,996 B2 | 5/2005 | Ikeda et al. | 359/296 |
| 2002/0067333 A1 * | 6/2002 | Uno et al. | 345/107 |
| 2003/0048521 A1 * | 3/2003 | Ikeda et al. | 359/296 |
| 2005/0174321 A1 | 8/2005 | Ikeda et al. | 345/107 |
| 2006/0087489 A1 * | 4/2006 | Sakurai et al. | 345/107 |
| 2006/0119568 A1 | 6/2006 | Ikeda | 345/107 |

FOREIGN PATENT DOCUMENTS

| | | |
|---|---|---|
| DE | 3403713 A1 | 8/1985 |
| JP | 9-211499 | 8/1997 |
| WO | WO 03/016994 A1 | 2/2003 |
| WO | WO 03/107086 A1 | 12/2003 |
| WO | WO 2004/008238 A1 | 1/2004 |
| WO | WO 2004/008239 | 1/2004 |

OTHER PUBLICATIONS

International Search Report dated Jul. 16, 2004, issued on Aug. 9, 2004, in corresponding PCT patent application No. PCT/JP2004/005737, and Written Opinion (undated).

* cited by examiner

*Primary Examiner*—Amare Mengistu
*Assistant Examiner*—Yuk Chow
(74) *Attorney, Agent, or Firm*—Fitzpatrick, Cella, Harper & Scinto

(57) ABSTRACT

A reflective display apparatus that creates a display by moving particles includes a front substrate and a back substrate, a plurality of colored charged particles and an insulated liquid sandwiched between the front substrate and back substrate. A reflective first electrode and a second electrode are placed on the back substrate, and a support member is provided to keep a distance between the front substrate and the back substrate. A first portion of an area of the first electrode which borders on the second electrode is covered by a colored layer, which color is the same as the color of the charged particles.

6 Claims, 7 Drawing Sheets

DISPLAY APPARATUS

TECHNICAL FIELD

The present invention relates to a moving particle type display apparatus which performs a display based on charged particles which move when a voltage is applied thereto.

BACKGROUND ART

Development and research into moving particle type display apparatuses which perform a display based on charged particles which move when a voltage is applied thereto is being carried forward vigorously in recent years, and great attention is focused above all on an electrophoresis display apparatus.

This type of electrophoresis display apparatus is provided with a back substrate and a front substrate arranged with a predetermined gap in between, and an insulating liquid and charged particles are placed in the gap between these substrates. Furthermore, each pixel is provided with a first electrode having a large display area and a second electrode having a small display area on one substrate (back substrate). For example, when a monochrome display is performed, a color difference is used for a display as follows:

(1) When charged particles are attracted to the first electrode and scattered over a wide area, the first electrode is covered with the charged particles, and therefore the color (e.g., black) of the charged particles is visible to an observer.

(2) When charged particles are attracted to the second electrode and concentrated in a narrow area, the color (e.g., white) of the area where the first electrode is formed is visible to the observer.

There is also a proposal on a display apparatus constructed in such a way that a shielding layer is placed to hide the second electrode and charged particles attracted by the second electrode are not visible to the observer (Japanese Patent Application Laid-Open No. H09-211499).

However, the above described electrophoresis display apparatus has problems yet to be solved in aspects of display quality. This seems to be attributable to the following two factors:

First, in the case (1) above, it is desirable that charged particles be scattered over the entire first electrode at substantially the same density and the first electrode be hidden behind the charged particles. However, in reality, the density of the charged particles is reduced in areas adjacent to the second electrode and the "color of the base (that is, the color of the area where the first electrode is formed)" is reflected and made visible. For this reason, the display quality deteriorates. The reasons for such a phenomenon are not clearly defined but there are a few possible reasons as follows:

1) Since the second electrode has the same polarity as that of the charged particles, an electrostatic repulsive force may be generated between the second electrode and charged particles.

2) When a barrier is placed so as to separate a pixel, this causes the "area where the second electrode is formed" and areas adjacent thereto not to become level but inclined and as a result, the charged particles may be hardly at rest.

DISCLOSURE OF THE INVENTION

The present invention has been implemented in view of the above described circumstances and it is an object of the present invention to provide a reflective display apparatus which creates a display by moving particles, comprising a front substrate and a back substrate, a plurality of charged particles sandwiched between the front substrate and back substrate, a first electrode and a second electrode placed on the back substrate, a support member provided to keep a distance between the front substrate and the back substrate and a colored area on the back substrate, characterized in that reflecting means provided in the space partitioned by the support member and the colored area is placed in such a way that the surface of projection on the back substrate of the second electrode and the surface of projection on the back substrate of the colored zone at least contact each other.

BEST MODE FOR CARRYING OUT THE INVENTION

Figure 1A:
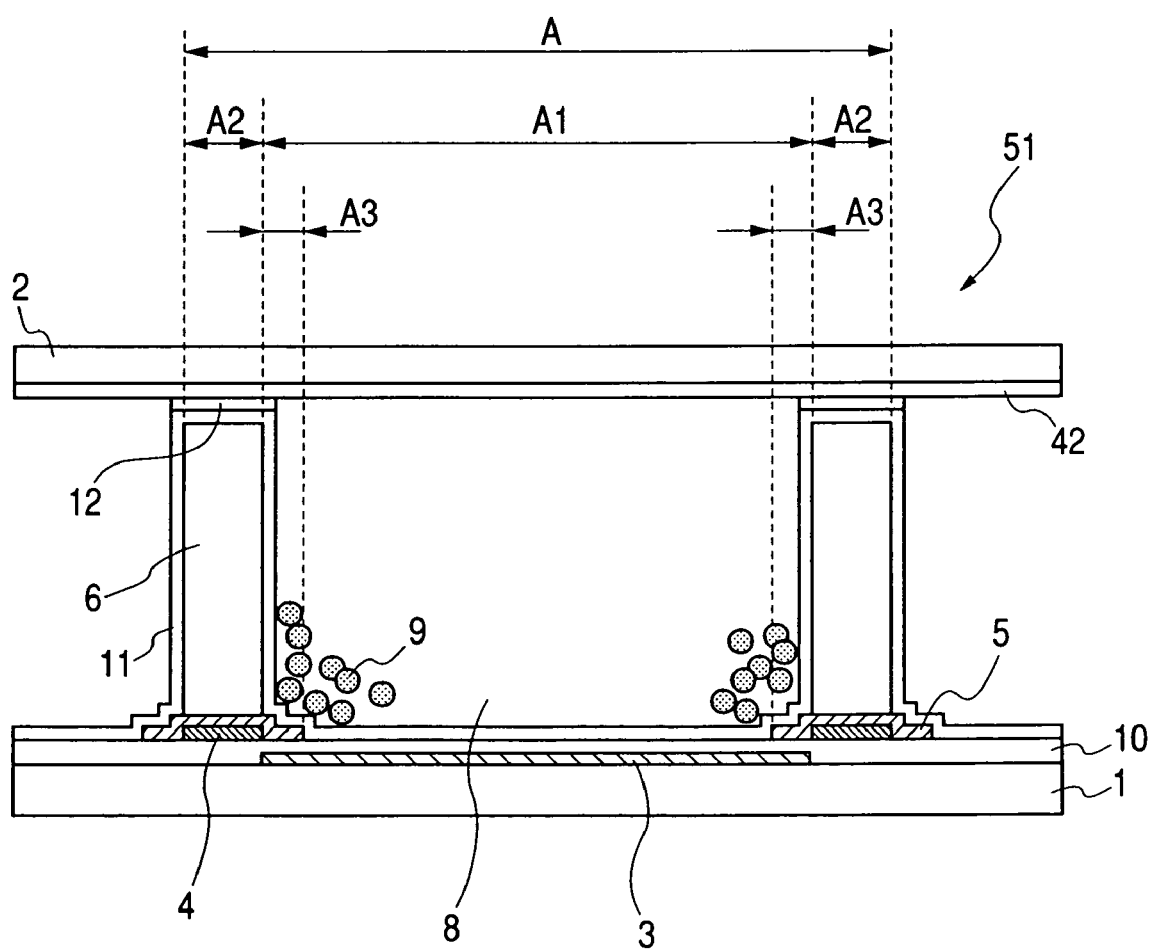
FIGS. 1A and 1B are cross-sectional views showing an example of a structure of an electrophoresis display apparatus according to the present invention.

For the purpose of explaining embodiments of the present invention, the following terms, etc., will be defined. The color of the surfaces of charged particles is defined as a "first color." The range in which charged particles can exist is defined as one "pixel." When the area of a portion involving the display performance of the apparatus is discussed, this area is defined as the area of an image obtained by vertically projecting the portion onto a plane parallel to the substrate. When this should be specifically clarified, a term "projected area" is used.

With reference now to FIGS. 1A and 1B to FIG. 3, an embodiment of the present invention will be explained below.

An electrophoresis display apparatus according to this embodiment includes a back substrate 1 and a front substrate 2 and an insulating liquid 8 and a plurality of charged particles 9 are placed between the substrates 1 and 2. For each pixel A, a first electrode 3 and a second electrode 4 are placed. The first electrode is placed along the back substrate in a relatively wide area (hereinafter referred to as "first electrode area") $A_1$ and the second electrode is placed in a relatively narrow area (hereinafter referred to as "second electrode area") $A_2$. When both the first electrode area and the second electrode area border each other on a boundary, a colored area $A_3$ colored in substantially the same color as the first color is made up of both areas adjacent to the boundary and when the first electrode area and the second electrode area do not directly border each other and there is an area between the two areas (hereinafter referred to as "intermediate area"), the colored area $A_3$ is made up of the intermediate area and areas adjacent to the intermediate area. Therefore, when the width of the second electrode between the first electrode areas is small, the entire second electrode area may be included in the colored area as shown in FIG. 1A, FIG. 1B, FIG. 2 and FIG. 3. The first electrode area except the colored area is colored in a different color (hereinafter referred to as "second color"). The colored area $A_3$ is preferably strip-shaped along the boundary between the first electrode and second electrode.

When the colored area $A_3$ is too wide, the part displaying the second color, that is, the proportion of the part of the first electrode area $A_1$ other than the colored area is reduced, causing visibility to be reduced when the second color is displayed. On the contrary, when the colored area $A_3$ is too narrow, the same problem as that of the conventional art occurs, that is, when the first color is displayed, loss of color may occur. The area of the colored area $A_3$ needs to be decided taking all these problems into consideration. More specifically, it is necessary to design the area and shape of the colored area $A_3$ taking into account an area C (hereinafter referred to as "particle hiding area") of the first electrode area hidden behind charged particles when the charged particles are concentrated in the vicinity of the second electrode and an area E where the first electrode area is exposed because of an insufficient density of the charged particles (hereinafter referred to as "exposed area of the first area") when the charged particles are moved onto the first electrode.

First Embodiment

With reference to FIGS. 1A and 1B to FIG. 3, a first embodiment of the present invention will be explained below.

Figure 1B:
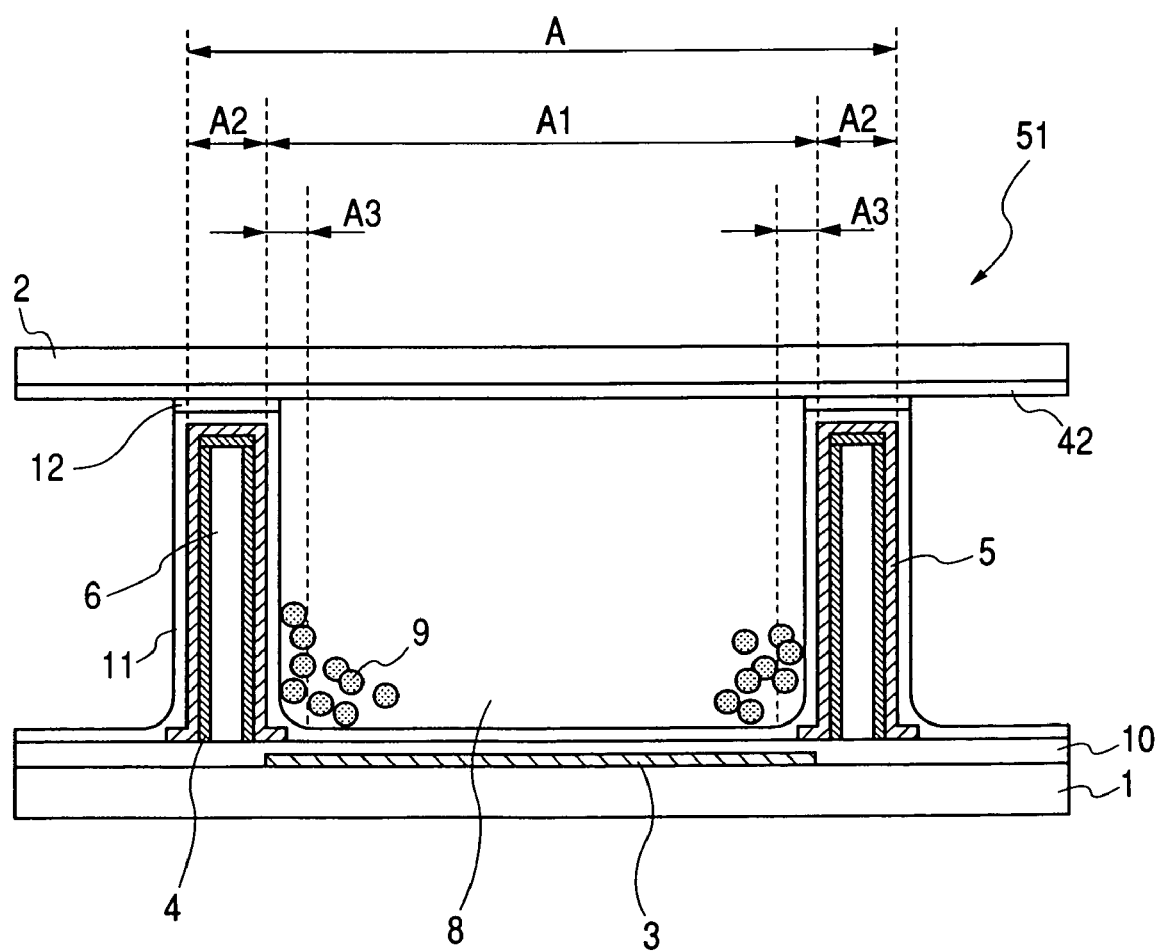
Figure 2:
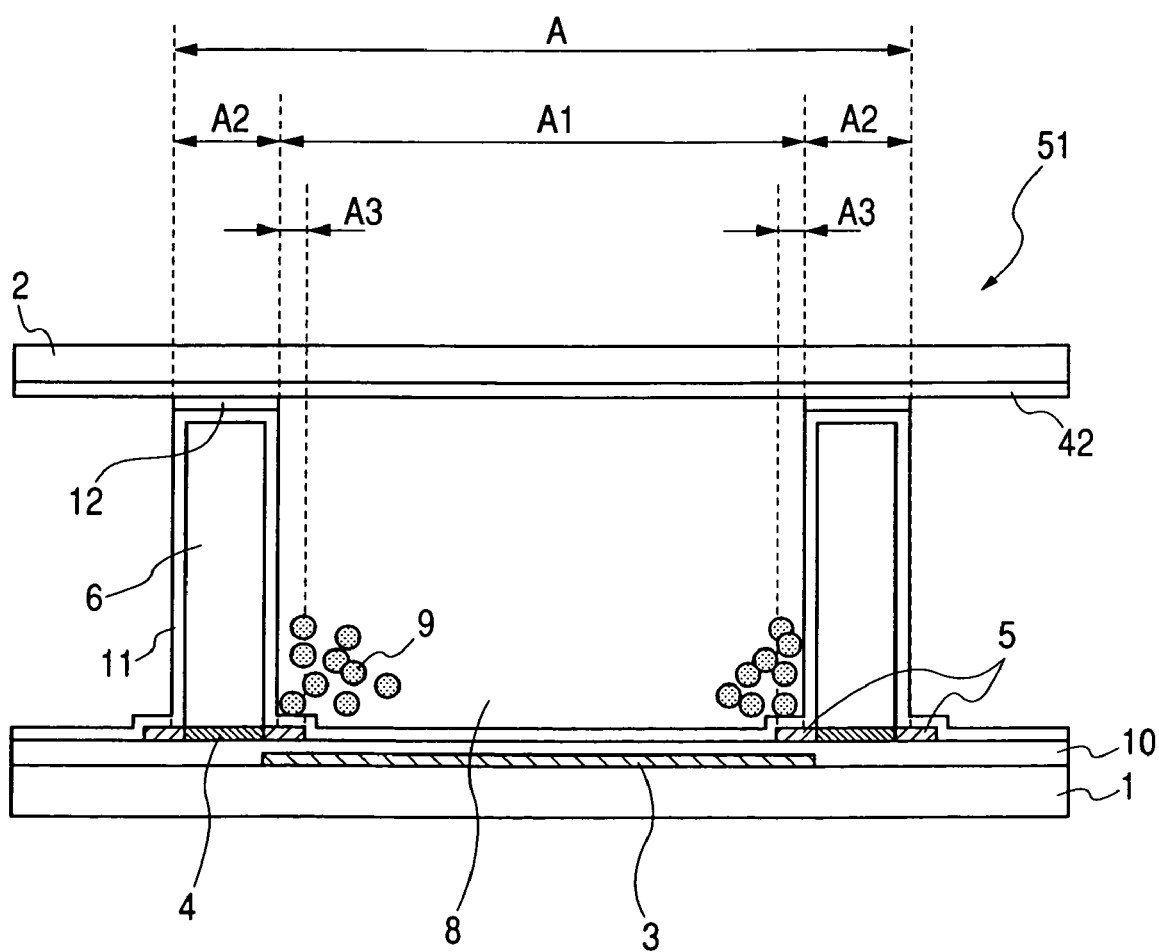
FIG. 2 is a cross-sectional view showing another example of the structure of the electrophoresis display apparatus according to the present invention.
Figure 3:
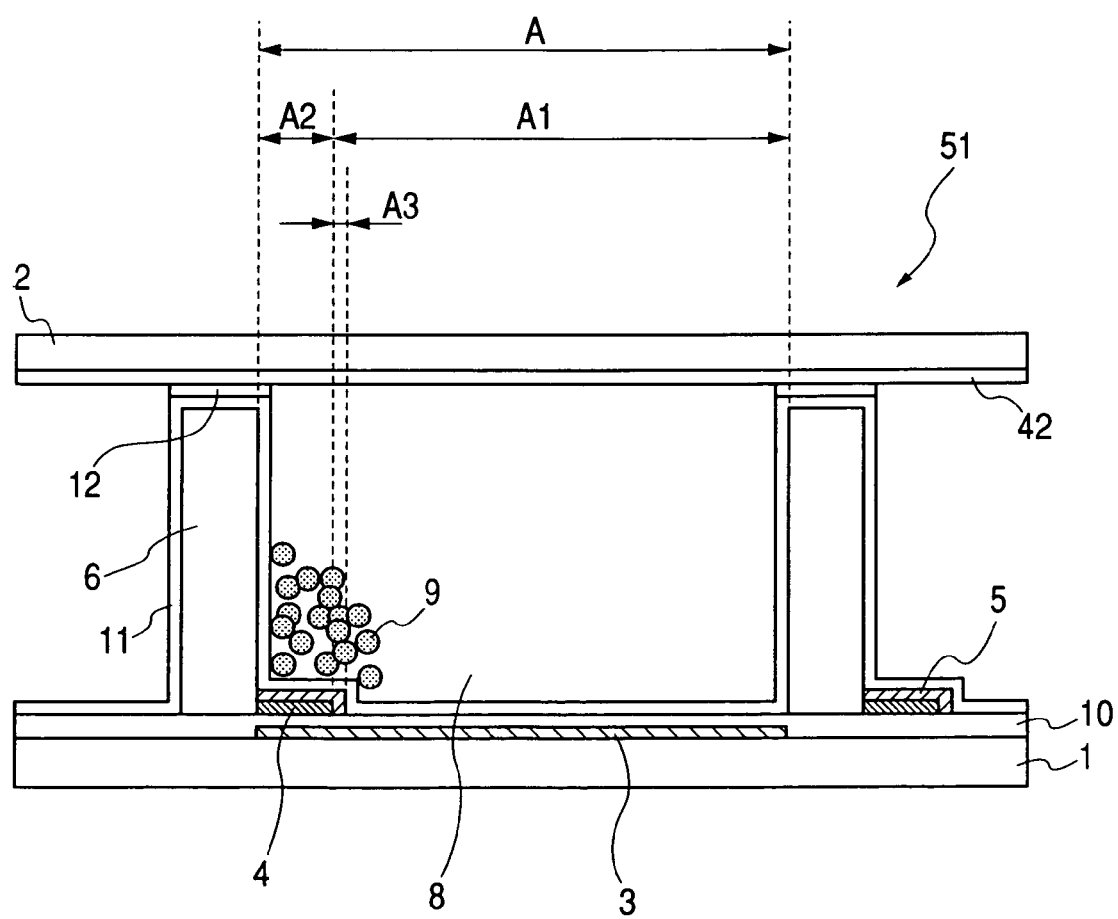
FIG. 3 is a cross-sectional view showing a further example of the structure of the electrophoresis display apparatus according to the present invention.

It is possible to place a support member 6 between substrates 1 and 2 so as to partition a pixel. In that case, a second electrode 4 may be placed:

(1) between the support member 6 and a back substrate 1 as shown in FIG. 1A and FIG. 2, (2) on the side of the support member 6 as shown in FIG. 1B or (3) at a position other than the position at which the support member 6 is placed as shown in FIG. 3.

In order to calculate the particle hiding area in the modes (1) to (3), it is possible to calculate the projected area of the group of charged particles concentrated in the vicinity of the second electrode from the pixel shape and diameter of charged particles and calculate the projected area based on this calculation result. When charged particles 9 cannot be accumulated on the surface of the second electrode 4 parallel to the back substrate as in the cases of the mode (1) in FIG. 1A and FIG. 2 above and the mode (2) in FIG. 1B, it is possible to calculate the particle hiding area from the projected area of the group of charged particles concentrated in the vicinity of the second electrode. When the charged particles 9 can be accumulated on the surface of the second electrode 4 parallel to the back substrate as in the case of the mode (3) above in FIG. 3, it is possible to calculate the particle hiding area by subtracting the area of the second electrode area on which charged particles are placed from the projected area of the group of charged particles concentrated in the vicinity of the second electrode.

In order to decide the value of the particle hiding area and the shape more accurately, it is possible to carry out a field intensity simulation and decide the particle hiding area and the shape along an equipotential line when a voltage of the same polarity as that of charged particles is applied to the first electrode 3 or based on the result of an optical observation when charged particles are concentrated around the second electrode.

With regard to the value of the exposed area of the first area and the shape, it is possible to carry out a field intensity simulation and decide the exposed area of the first area and the shape along an equipotential line when a voltage of the polarity opposite to that of charged particles is applied to the first electrode 3. Or it is also possible to decide the exposed area of the first area and the shape based on the result of an optical observation when particles are moved onto the first electrode and calculate the exposed area of the first area and the shape according to the actual situation.

When the particle hiding area including the shape exceeds the exposed area of the first area, it is preferable to define the intermediate area and shape for the colored area $A_3$. In that case, the colored area $A_3$ need not necessarily cover the entire width of accumulated charged particles.

On the other hand, when the particle hiding area is smaller than the exposed area of the first area, it is necessary to decide the area of the colored area and the shape according to the priority level of light and shade, but from the standpoint of a pixel aperture ratio, it is desirable to set the area and the shape of the colored area to the particle hiding area or smaller.

A display is performed by applying a voltage between the second electrode 3 and first electrode 3 and thereby moving charged particles 9 between the two electrodes. For example, when the charged particles 9 are attracted to the first electrode 3 and placed so as to cover the first electrode 3, the first color of the charged particles 9 is visually recognized as the color of the pixel. On the other hand, when the charged particles 9 are attracted to the second electrode 4, the first electrode area $A_1$ is exposed and the second color is visually recognized as the color of the pixel.

Note that there are various methods for coloring the first electrode area $A_1$ such as a method of coloring the first electrode itself, a method of providing a colored layer in addition to the electrode and a method of coloring an insulating layer placed so as to cover the first electrode.

Furthermore, as the method of coloring the colored area A3, a method of placing a colored layer (see reference numeral 5 in FIGS. 1A and 1B) colored in substantially the same color as the first color is available. As the method of forming such a colored layer, a method of applying a photosensitive resin layer mixed with pigment and dye, then carrying out exposure and wet developing or a method of forming the colored layer using a printing method is available.

Hereinafter, components of the electrophoresis display apparatus will be explained.

It is preferable to place the support member 6 in the gap between substrates so as to partition one pixel from another. It is possible to use polymer resin as this support member 6 and more specifically, it is possible to use polyimide resin, polyester resin, polyacrylate resin, polymethacrylate resin, polycarbonate resin, polyallylate resin, novolac resin, epoxy resin, etc., as this support member 6. Examples of the method of forming this support member 6 include:

Method of applying a photosensitive resin layer, then carrying out exposure and wet developing Method of forming support member 6 using a printing method Method of forming a barrier and then adhering it to the substrate Method of forming support member 6 on an optically transparent substrate surface through molding For the substrate 1 and 2, it is possible to use a polymer film such as polyethylene terephthalate (PET), polyether sulfone (PES), polyimide (PI) and polyethylene naphthalate (PEN), polycarbonate (PC), an inorganic material such as glass and quartz or a stainless steel substrate, the surface of which includes an insulating layer. Note that for the substrate 2 on the observer side, it is possible to use a material with high transmittance of visible light such as a transparent polymer film and glass. Furthermore, it is also possible to form a resin layer (see reference numeral 42) made of a polymer material whose rubber hardness is within a range of 10 to 90, or more specifically silicon resin, natural rubber, thermoplastic elastomer resin on the surface of the substrate 2 (surface contacting the insulating liquid 8).

Furthermore, it is possible to use any material for the electrodes 1 and 2 if it is at least a conductive material that can be patterned, for example, indium tin oxide (ITO), aluminum and titanium. Note that in the electrophoresis display apparatus shown in FIGS. 1A and 1B, the first electrode 3 and second electrode 4 are formed at different heights (that is, a position offset with respect to the direction normal to the substrate), but they can also be formed at the same height. Furthermore, in the electrophoresis display apparatus shown in FIGS. 1A and 1B, the first electrodes 3 of different pixels are separated from one another and there is no electrical continuity among them, but it is also possible to provide electrical continuity among the first electrodes 3 of different pixels.

It is preferable to form an insulating layer on the surfaces of these electrodes to
  insulate one electrode from another or
  prevent injection of charges from electrode to charged particles 9.

As a material used for this insulating layer, it is preferable to use a thin film in which pinholes are hardly formed. More specifically, polyimide resin, polyester resin, polyacrylate resin, polymethacrylate resin, polycarbonate resin, etc., having high transparency can be used.

Furthermore, it is also possible to:
  place a scattering layer in front of the first electrode 3 (upper part in the figure) (see reference numeral 10) or
  make the first electrode 3 transparent and place a reflecting layer behind (lower part in the figure) (not shown).

As the scattering layer, it is possible to use a transparent insulating layer containing highly reflective micro particles and it is preferable to use titanium oxide or $Al_2O_3$ as micro particles and acrylic resin, urethane resin, fluorine-based resin, norbornene resin, PC, PET, etc., can be used as the insulating resin. When the scattering layer is thick, it is possible to increase the reflective factor and improve the display quality, but on the contrary it is possible to cause the drive voltage to rise. Therefore, the thickness of the scattering layer is preferably within a range of 0.1 to 20 μm.

An average particle diameter of charged particles 9 used in the present invention is preferably within a range of 0.1 μm or above and 10 μm or below. The coloring agent is not particularly limited, but it can be, for example, carbon black, titanium oxide, barium sulfate, nigrosine, iron black, aniline blue, calcoil blue, chrome yellow, ultramarine blue, Du Pont oil red, quinoline yellow, methylene blue chloride, phthalocyanine blue, phthalocyanine green, sky blue, rhodamine lake, etc. Furthermore, as particle resin, polystyrene, polyethylene, polyester, polymethacrylate, polyacrylate, polyacrylic ester, polyethylene-based resin such as polyethylene-acrylic acid copolymer, polyethylene-methacrylic acid copolymer, polyethylene-vinyl acetate copolymer, other polymer material such as polyvinyl chloride resin, nitrocellulose, phenol resin, and polyamide resin can be used. These materials can be used singly or with two or more types combined.

As the insulating liquid 8, it is preferable to use a low-conductive, high-insulating organic solvent. Such a solvent can be aromatic hydrocarbon-based solvent such as benzene, toluene and xylene, aliphatic hydrocarbon-based solvent such as hexane, cyclohexane, paraffin-based hydrocarbon solvent, isoparaffin-based hydrocarbon and naphthene-based hydrocarbon, hydrocarbon halide-based solvent or silicon oil, high purity petroleum, etc., but above all, aliphatic hydrocarbon solvent is preferably used and more specifically, isopar-G, H, M, L (manufactured by Exxon Chemical), Shellsol (Showa Shell Japan), IP Solvent 1016, 1620, 2028, 2835 (Idemitsu Petrochemical), etc., can be used. These can be used singly or with two or more types combined.

The insulating liquid 8 may also contain additives such as charge control agent, dissociation stabilizer, scattering stabilizer for the purposes of increasing the amount of charge of charged particles or providing charge stability.

As the charge control agent, it is preferable to use metallic soap and more specifically, metallic soap such as cobalt naphthenate, zirconium naphthenate, copper naphthenate, iron naphthenate, lead naphthenate, manganese naphthenate, zinc naphthenate, cobalt octanate, zirconium octanate, iron octanate, lead octanate, nickel octanate, manganese octanate and zinc octanate can be used but the charge control agent is not limited to them.

Furthermore, rosin ester or rosin derivative can be used for the purposes of increasing the amount of charge of charged particles or providing charge stability. Rosin ester or rosin derivative is not particularly limited as far as it is soluble to the insulating liquid, but can be, for example, gum rosin, wood rosin, tallol rosin, rosin denatured maleic acid, rosin denatured pentaerythritol, rosin glycerin ester, partially hydrogen added rosin methyl ester, partially hydrogen added rosin glycerin ester, partially hydrogen added rosin triethylene glycol ester, fully hydrogen added rosin pentaerythritol ester, maleic acid denatured rosin ester, fumaric acid denatured rosin ester, acrylic acid denatured rosin ester, maleic acid denatured rosin pentaerythritol ester, fumaric acid denatured rosin pentaerythritol ester, acrylic acid denatured rosin glycerin ester, maleic acid denatured rosin glycerin ester, fumaric acid denatured rosin glycerin ester and acrylic acid denatured rosin glycerin ester.

Specific examples of the scattering stabilizer include polybutadiene, polyisoprene, polyisobutylene, polybutene, styrene butadiene copolymer, styrene isoprene copolymer, styrene maleic anhydride copolymer, norbornene resin and polyethylene wax. Above all, styrene butadiene copolymer is preferable, for example, as commercially available materials, E-SBR, S-SBR (manufactured by JSR Corporation), NIPOL 1502, NIPOL 1712, NIPOL NS112, NIPOL NS116, NIPOL 1006, NIPOL 1009 (manufactured by Zeon Corporation), TAFDENE, TUFPRENE, Asaprene (manufactured by Asahi Kasei Chemical Corporation), Sumitomo SBR (manufactured by Sumitomo Chemical Co., Ltd.), etc., can be used.

In the present invention, these charge control agents, charge stabilizers and scattering stabilizers can be used singly or with two or more types combined.

Then, the effects of this embodiment will be explained.

According to this embodiment, of the first electrode area $A_1$, the area $A_3$ adjacent to the second electrode 4 is colored in substantially the same color as the color of the charged particles 9 (first color). Therefore, when the charged particles 9 are attracted to the first electrode 3, even if the density of the charged particles in the area $A_3$ is lower (than the density of the charged particles in the rest of the first electrode area $A_1$), the color seen from the gaps of charged particles is simply substantially the same color as the first color and the low density of charged particles is hardly visually recognized, which prevents the display quality from deteriorating.

Second Embodiment

With reference to FIGS. 4A, 4B, 5A and 5B, another embodiment of the present invention will be explained below.

Figure 4A:
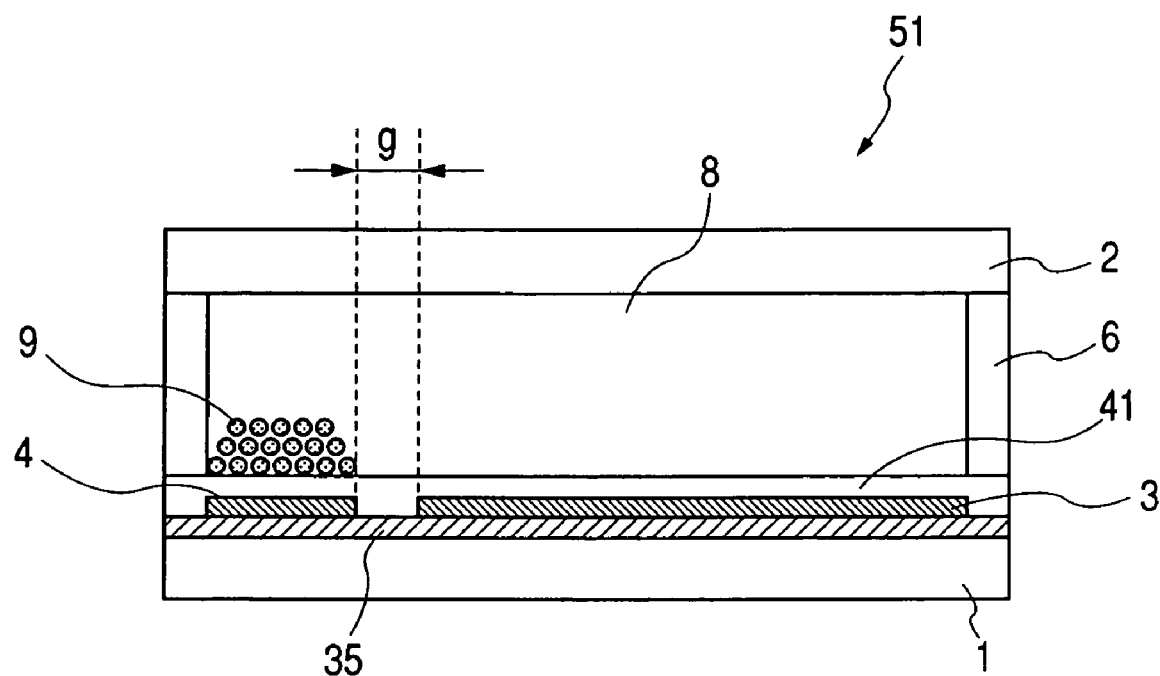
FIGS. 4A and 4B are cross-sectional views showing a still further example of the structure of the electrophoresis display apparatus according to the present invention.
Figure 4B:
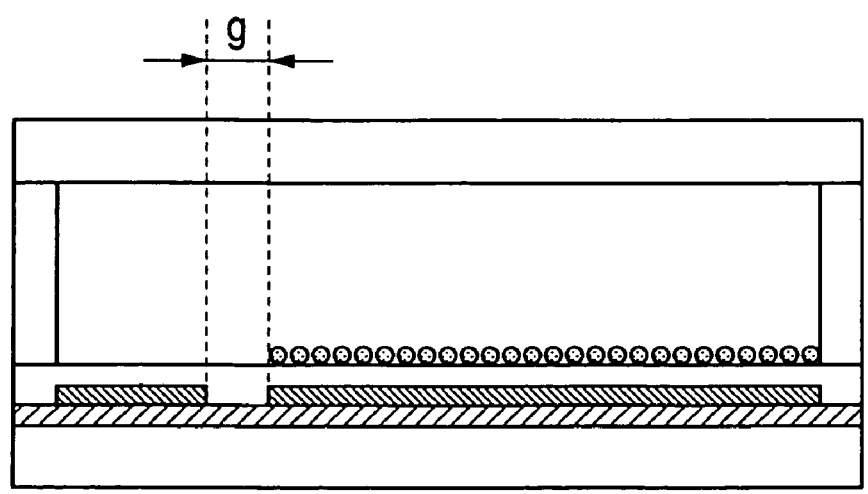

An electrophoresis display apparatus according to this embodiment is provided, as shown in FIGS. 4A and 4B, with a back substrate 1 and a transparent front substrate 2 arranged with a certain spacing in between, a support member 6 placed so as to keep the spacing between the substrates constant, a transparent insulating liquid 8 placed in a space surrounded by the back substrate 1, front substrate 2 and support member 6, a plurality of colored charged particles 39 scattered in the insulating liquid, a colored first electrode 3 formed on the back substrate 1, a second electrode 4 colored differently from the first electrode, a transparent insulating layer 41 placed on the first electrode 3 and second electrode 4 and a colored layer 35 placed on the back substrate 1. This colored layer 35 is placed in a gap between the first electrode 3 and second electrode 4 in a pixel.

Figure 5A:
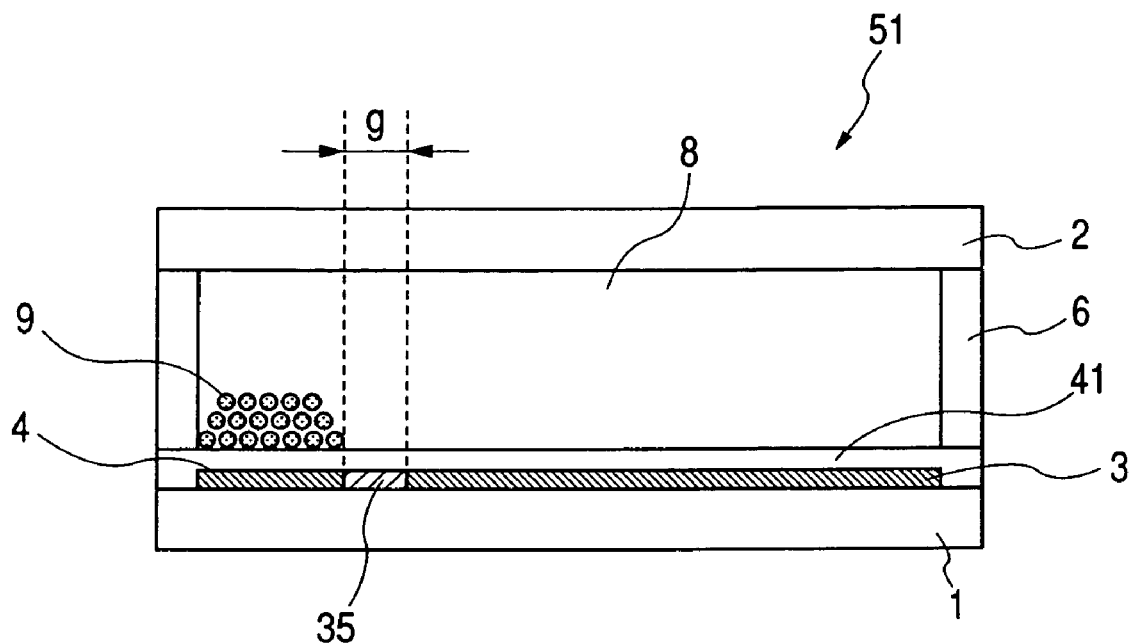
FIGS. 5A and 5B are cross-sectional views showing a still further example of the structure of the electrophoresis display apparatus according to the present invention.
Figure 5B:
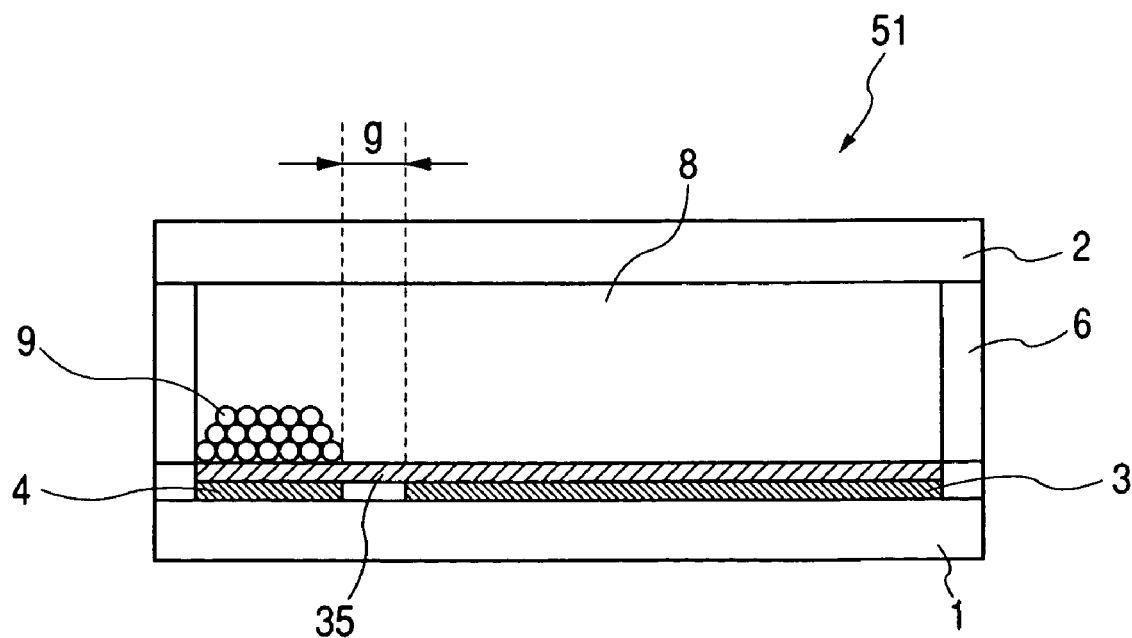

Note that it is important that the colored layer 35 be placed so as to include at least the gap between the first electrode 3 and second electrode 4. However, the colored layer 35 shown in FIGS. 4A and 4B does not limit the position and shape thereof. In addition to the position shown in FIGS. 4A and 4B, it is also possible to place the colored layer 35 on the same plane as those of the first electrode 3 and second electrode 4 as shown in FIG. 5A or place the colored layer 35 on the plane including the first electrode 3 and second electrode 4 using white charged particles to display a white color and the color of the colored layer as shown in FIG. 5B. As preferred modes of this colored layer 35, it is preferable to place it so as to have a greater width than the gap between the first electrode 3 and second electrode 4, place it so as to include the plane overlapping the support member 6 within a plane horizontal to the back substrate 1 or form a film integral with the back substrate 1 so as to eliminate the need for placing it positioned at the gap between the first electrode 3 and second electrode 4 as shown in FIGS. 4A and 4B.

However, it is necessary to set the volume resistivity value so as to prevent the colored layer 35 from constituting an electrically short-circuit path between pixels. It is preferable to use a material for the colored layer having a volume resistivity value of 1E+6 Ωcm or greater.

Furthermore, it is necessary to set the color of the colored layer to a color capable of removing light of a wavelength region, which affects display contrast or brightness. For example, when the color of the charged particles 39 is substantially the same as the color of the second electrode 4, it is preferable that the color of the second electrode 4 be substantially the same as the color of the colored layer 35. Furthermore, to completely prevent unnecessary reflected light from between the electrodes, the color of the colored layer 35 is preferably black.

The case where the color of the first electrode 3 is different from the color of the second electrode 4 has been described above, but note that this explanation does not limit the colors of the respective electrodes. For example, the second electrode 4 and first electrode 3 may also have the same color. The colors of these electrodes should be selected and designed in consideration of the combination of colors, etc., of the charged particles 39 and insulating liquid 8 so that optimal brightness and contrast can be obtained for the display apparatus.

Furthermore, in FIGS. 4A and 4B, only one type of the charged particles 39 is described, but two or more types can also be used. For example, there may also be a case where a plurality of types of particles having different particle diameters or different colors or different amounts of charge exist.

Furthermore, the color of the insulating liquid 8 is not limited to a transparent color. Any insulating liquid having nature of allowing light to transmit may be used and selected arbitrarily depending on its display color characteristic.

Moreover, the type of the insulating liquid 8 is not limited to one type in the entire display area.

That is, among pixel areas partitioned by the support members 36, there may be cases where different types of insulating liquid 8 are included. For example, it is also possible to form three consecutive areas as one set and use RGB or CMY as colors of the insulating liquids that fill the three areas and repeat this set cyclically in the display area.

Then, a display method for the electrophoresis display apparatus shown in FIGS. 4A and 4B will be explained.

A display is performed by applying a voltage between the second electrode 4 and first electrode 3 and moving the charged particles 39 between the two electrodes. Here, a case where the first electrode 3 is colored in a highly reflective color and the second electrode 4 is colored in black will be explained. As shown in FIG. 4A, it is possible to concentrate charged particles 39 on the second electrode 4 and allow the first electrode 3 to reflect the incident light and thereby create a pixel in a bright display state. On the other hand, as shown in FIG. 4B, when the charged particles 39 are placed on the first electrode 3 and the reflective first electrode 3 is thereby covered with the charged particles 39. Thus, the incident light is reflected by the colored charged particles 39, which causes the color of the charged particles 39 to be the color displayed in the pixel. For example, when the charged particles 39 are colored in black, the display of the pixel in FIG. 4B becomes a black display.

Note that since the colored layer 35 is provided between the first electrode 3 and second electrode 4 and below the bottom face of the support member 6, it is possible to effectively remove unnecessary reflected light from those areas. Thus, the image created by combining the bright display and black display shown in FIGS. 4A and 4B becomes a display with high contrast.

Note that the components of the electrophoresis display apparatus according to this embodiment may be the same members as those described in the first embodiment.

As shown above, the effects of this embodiment include the ability to effectively prevent reflected light from the gap between the second electrode and first electrode, which is one cause of leakage of light, and at the same time the ability to remove leaked light from between pixels in this process of forming a colored layer. This makes it possible to achieve high contrast with a simple structure. Furthermore, as shown in FIGS. 4A and 4B, the structure in which a colored layer is placed between both electrodes and the back substrate eliminates the need for fine positioning in manufacturing, which simplifies manufacturing. In this way, it is possible to achieve high yield in the process of the colored layer.

EXAMPLES

The present invention will be explained in more detail using Examples below.

Example 1

In this example, an electrophoresis display apparatus 51 having the structure shown in FIGS. 1A and 1B will be created.

That is, a back substrate 1 and front substrate 2 are arranged with a predetermined spacing in between, a support member 6 is placed in the spacing between these substrates 1 and 2 so as to partition a pixel A and each pixel A is filled with an insulating liquid 8 and charged particles 9. Furthermore, each pixel A is provided with a first electrode 3 and second electrode 4 as shown in the figure. Then, a scattering layer 10 is formed on the entire substrate so as to cover the first electrode 3 and a colored layer 5 is placed in the areas $A_2$ and $A_3$ so as to cover the second electrode 4. Furthermore, the surfaces of this scattering layer 10, colored layer 5 and support member 6 are coated with a transparent insulating layer 11. Furthermore, a resin layer 42 is formed on the surface of the front substrate 2 and an adhesion layer 12 is placed between this front substrate 2 and support member 6.

In the present example, polystyrene particles (average particle diameter of 2.5 μm) colored in black with carbon black (CB, average particle diameter of 80 nm) which is inorganic pigment is used as the charged particles 9, the colored layer 5 is also colored in black and the first electrode area $A_1$ (to be precise, the part $A_1$ which is the first electrode area except the area $A_3$ where the colored layer is placed) is designed to appear white through the function of the scattering layer 10.

Then, the method of manufacturing the electrophoresis display apparatus will be explained.

First, an aluminum film is formed to a thickness of 100 nm on the surface of the glass substrate 1 of 0.7 mm thick, which is then patterned to form the first electrode 3. Then, the polyurethane resin layer (scattering layer) 10 whitened by mixing titanium oxide micro particles is formed so as to cover this first electrode 3. Furthermore, a dark-colored carbonized titanium film is formed in the area $A_2$, patterned into a linear shape through photolithography and dry etching to form the second electrode 4. The second electrode 4 has a thickness of 50 nm and a line width of 12 μm.

Furthermore, the aforementioned colored layer 5 is formed. This colored layer 5 is linear-shaped so as to be placed not only in the area $A_2$ where the second electrode 4 is formed but also in the area (see reference numeral $A_3$) where the first electrode 3 is formed. Furthermore, this colored layer 5 is formed by applying photosensitive resin (CFPR-BK738S manufactured by Tokyo Ohka Kogyo Co., Ltd.) in which pigment is scattered to a film thickness of 1 μm using a spinner and patterning it through exposure and wet developing. This colored layer 5 has a width of 22 μm and the area $A_3$ has a width of 5 μm.

Then, by applying photosensitive epoxy resin (SU8 manufactured by MacDermid, Incorporated) followed by exposure and wet developing, the support member 6 is formed in the area $A_2$ where the second electrode 4 is formed. The support member 6 has a height of 30 μm, width of 12 μm and spacing of 120 μm. Then, the transparent resin layer 11 made of polyacrylate resin (optomer SS6699 manufactured by JSR Corporation) is formed so as to cover the inner surface of the cell.

Then, the UV-cured adhesion layer 12 is formed on the top surface (surface to which the substrate 2 is pasted) of the support member 6.

Then, the concave section partitioned by the support member 6 is filled with a scattering liquid mixed with charged particles 9. The scattering liquid is prepared by mixing the charged particles of 1 weight ratio, isopar-H (manufactured by Exxon Corporation) of 100 weight ratio which is an aliphatic hydrocarbon solvent, zirconium octanate (Nikka octics zirconium, manufactured by Nihon Kagaku Sangyo Co., Ltd.) of 0.1 weight ratio, rosin ester (NEOTALL 125H, manufactured by Harima Chemicals, Inc.) of 2.5 weight ratio and styrene butadiene copolymer (Asaprene 1205, manufactured by Asahi Kasei Chemicals Corporation) of 0.8 weight ratio and stirring it for one hour. Note that the charged polarity of the charged particles is negative.

Finally, the substrate 2 made of a polycarbonate film (100 μm thick) is adhered to the support member 6 and UV-cured to create the electrophoresis display apparatus of the present invention.

Then, the display condition of the present example will be explained.

In the reflective electrophoresis display apparatus 51 created using the above-described method, when a voltage of the same polarity as the charged polarity of the charged particles 9 scattered in the insulating liquid 8 is applied to the first electrode 3, the charged particles 9 are attracted to the second electrode 4, which produces a white display. On the contrary, when a voltage of the polarity opposite to the charged polarity of the charged particles 9 scattered in the insulating liquid 8 is applied to the first electrode 3, the charged particles 9 are scattered over the first electrode 3 and no white patch is found in the area $A_3$ and good black brightness is confirmed.

Example 2

In the present example, the electrophoresis display apparatus 51 shown in FIG. 2 will be created. This has a structural difference from the electrophoresis display apparatus shown in FIGS. 1A and 1B in that the colored layer 18 is placed only in the area $A_3$ (without placing it in the area $A_2$ where the second electrode 4 is placed) and the rest of the structure and the manufacturing method are the same.

Then, when the apparatus is driven in the same way as Example 1, the same display quality can be confirmed.

Example 3

In the present example, the electrophoresis display apparatus 51 shown in FIG. 3 will be created. That is, the second electrode 4 is placed not between the support member 6 and the back substrate 1 but outside the area where the support member 6 is placed and the colored layer 28 is placed so as to cover the second electrode 4 and stick out toward the first electrode 3. Note that the second electrode 4 has a width of 30 μm and the colored layer 28 has a width of 35 μm. The rest of the structure and the manufacturing method are the same as those in Example 1.

When the apparatus is driven in the same way as Example 1, the same display quality can be confirmed.

Example 4

In the present example, the electrophoresis display apparatus shown in FIGS. 4A and 4B will be explained.

Suppose the display apparatus to be created has 200×200 pixels and one pixel is a square of 100 μm per side. Each pixel is surrounded on all four sides by a transparent support member 6. The support member 6 has a height of 25 μm and this distance corresponds to the cell gap. The support member 6 has a width of 5 μm and the area occupied by the support member 6 within the substrate plane corresponds to the non-aperture area. Furthermore, a black colored layer 35 is formed as a film integral with the back substrate within a range of the display area. Furthermore, a first electrode 3 and a second electrode 4 are placed on the colored layer 35 on the back substrate 1 and suppose a gap g (spacing indicated by dotted lines in the figure) between the two electrodes is 10 μm. Suppose the area ratio within the pixel of the first electrode 3 and second electrode 4 is 7:3. To provide the first electrode 3 with a light absorption characteristic, a transparent material is used. That is, light incident on the second electrode 4 passes through the transparent second electrode 4 and is absorbed by the colored layer 35 placed beneath the second electrode 4. On the other hand, a highly reflective metal is used for the first electrode 3 so as to provide it with a light reflecting characteristic and a fine concavo-convexo structure is provided on the electrode surface though not shown. This concavo-convexo structure is designed so as to scatter reflected light. Furthermore, in order to prevent charged particles 39 and an insulating liquid 8 from provoking electrode reaction or charge injection, etc., causing the behavior of the charged particles 39 to change to substantially an instable condition with time, a transparent thin film insulating layer 41 is laminated on the second electrode 4 and first electrode 3. Furthermore, the black charged particles 39 of a predetermined density and transparent insulating liquid 8 are stably enclosed in a closed space surrounded by the back substrate 1, front substrate 2 and support member 6.

Then, the method of manufacturing the electrophoresis display apparatus according to the present example will be explained below.

As the back substrate 1 shown at the bottom in the figure which is a substrate, a 150 μm PET film is used, a photosensitive resin material (CFPR BK, manufactured by Tokyo Ohka Kogyo Co., Ltd.) containing carbon is applied thereto to a thickness of 3 μm to form the colored layer 35. Then, the black resin material other than the display area is removed using photolithography. Then, the second electrode 3 is patterned using a transparent electrode ITO. In the area where the first electrode 3 is placed, a micro concavo-convexo structure is formed (not shown) using resin beforehand, the first electrode 3 is patterned thereon using Al to form the reflective first electrode 3. Next, the insulating layer 41 is formed in the display area using transparent acrylic-based resin (optomer, manufactured by JSR Corporation) so as to cover the second electrode 4 and first electrode 3. Then, the support member 6 is formed using a thick film photoresist (THB, manufactured by JSR Corporation) through photolithography. Then, though not shown, polycarbonate resin is applied to the support member 6 and insulating layer 41 as a thin surface coating layer. The thickness of the surface coat layer is approximately 100 nm. Applying this surface coat layer has the effect of strengthening the support member 6 with a high aspect ratio against shock. Then, the space partitioned by the support member 6 on the back substrate 1 is filled with the transparent insulating liquid 8 and a plurality of black charged particles 39 in such a way that the density of charged particles 39 of all pixels becomes uniform. As the insulating liquid 8, isopar (manufactured by Exxon) is used and black charged particles 39 containing carbon having an average particle diameter of 3 μm are scattered therein and used. Furthermore, isopar (manufactured by Exxon) is used for the insulating liquid 8 and imide succinate is included as a charge control agent. After filling, the top end of the support member 6 and the front substrate 2 are adhered together and the space portioned by the support member 6 is sealed with the insulating liquid 8 and charged particles 39. After the sealing, the front substrate 2 and back substrate 1 are adhered together around the substrate using an adhesive (not shown).

Then, the display condition in the present example will be explained.

In the reflective electrophoresis display apparatus 51 created using the above-described method, when a voltage of the same polarity as the charged polarity of the charged particles 39 scattered into the insulating liquid 8 is applied to the first electrode 3, the charged particles 39 are attracted to the second electrode 4, producing a bright display. On the contrary, when a voltage of the polarity opposite to the charged polarity of the charged particles 39 scattered into the insulating liquid 8 is applied to the first electrode 3, the charged particles 39 are attracted to the first electrode 3, producing a black display, the same black color as the color of the charged particles 39. When a bright display or dark display is performed in this way, the light leaking from the gap between the first electrode 3 and second electrode 4 and from the support member 6 is mostly intercepted by the colored layer 35, making it possible to obtain a display with high contrast. Moreover, since this is a process capable of forming the light-reflecting layer 35 without any control over positioning in a narrow gap of only 10 μm between the first electrode 3 and second electrode 4, it is possible to drastically improve yield.

Example 5

Figure 6:
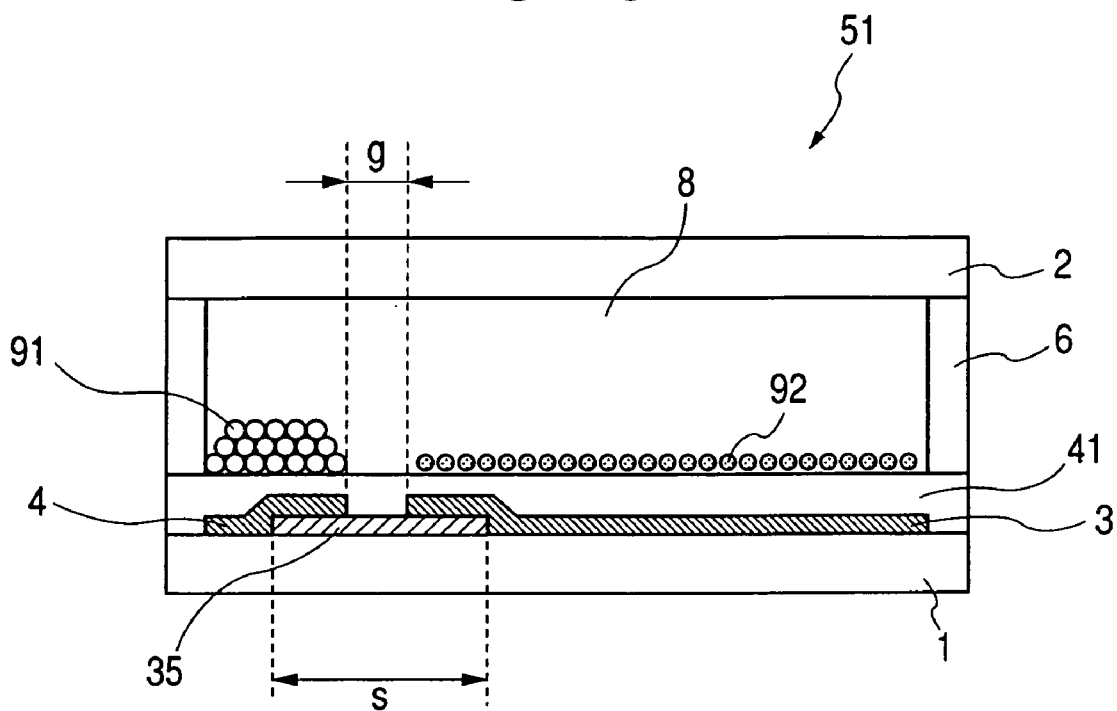
FIG. 6 is a cross-sectional view showing a still further example of the structure of the electrophoresis display apparatus according to the present invention.

In the present example, the electrophoresis display apparatus shown in FIG. 6 will be explained.

Suppose the display apparatus to be created has 200×200 pixels and one pixel is a square of 100 μm per side. Each pixel is surrounded by a black support member 6. The support member 6 has a height of 10 μm and this distance corresponds to the cell gap. The support member 6 has a width of 5 μm.

The gap (g in the figure) between the first electrode 3 and second electrode 4 placed on the back substrate 1 is set to 5 μm and the colored layer 35 having a width (s in the figure) of 20 μm is provided on the back substrate 1 in such a way as to include the gap. Suppose the area ratio within the pixel of the first electrode 3 and second electrode 4 is 7:3. That is, the width s of the colored layer 35 is set sufficiently wide compared to the distance g between the electrodes. This colored layer 35 is patterned by applying a printing method to resin containing carbon. Furthermore, the second electrode 4 and first electrode are made of the same material. Furthermore, in order to prevent charged particles 39 and an insulating liquid 8 from provoking electrode reaction or charge injection, etc., causing the behavior of the charged particles 39 to change to substantially an instable condition with time, a transparent thin film insulating layer 41 is laminated on the first electrode 3 and second electrode 4. Furthermore, a transparent insulating liquid 8 in which white charged particles 39-1 and black charged particles 39-2 of a predetermined density are scattered is stably enclosed in a closed space surrounded by the back substrate 1, front substrate 2 and support member 6. The white charged particles 39-1 and black charged particles 39-2 are charged with different polarities in the insulating liquid 8.

Then, the method of manufacturing the electrophoresis display apparatus according to the present example will be explained below.

The colored layer 35 is patterned on the back substrate 1 which is the substrate at the bottom in the figure using an SUS substrate having a thickness of 0.5 mm and a black resin layer containing carbon thereon according to a printing method. The width s of the colored layer at this time is set to 20 μm. The first electrode 3 and second electrode 4 are formed thereon simultaneously using Al. The gap g between the two electrodes is 5 μm and the electrodes are placed so as to be superimposed on the already formed colored layer 35. Since the width s of the colored layer is sufficiently large compared to the gap g between the electrodes, the positioning process when the first electrode 3 and second electrode 4 are patterned is extremely easy. Then, the transparent insulating layer 41 is coated so as to cover the first electrode 3 and second electrode 4. Then, the support member 6 is formed using photosensitive resin containing carbon around the pixel. Then, the space partitioned by the support member 6 is filled with the insulating liquid 8 in which white charged particles 39 and black charged particles 39-2 are scattered. Titanium oxide having a particle diameter of 1 to 2 µm is used for the white charged particles 39-1 and polystyrene-polystyrene methacrylate copolymer resin containing carbon black having a particle diameter of 0.1 to 0.3 µm is used for the black charged particles 39-2. Furthermore, isopar (Exxon) is used for the insulating liquid 8 and imide succinate is included therein as a charge control agent. Then, using the front substrate 2, the closed space surrounded by the back substrate 1, front substrate 2 and support member 6 is sealed with the insulating liquid 8 in which the white charged particles 39-1 and black charged particles 39-2 are scattered.

In the reflective electrophoresis display apparatus 51 created using the above described method, when a voltage of the same polarity as the charged polarity of the white charged particles 39-1 scattered into the insulating liquid 8 is applied to the first electrode 3, the white charged particles 39-1 are attracted to the second electrode 4 and the black charged particles are attracted to the first electrode 3, and therefore approximately 70% of light incident on the pixel is absorbed by the black charged particles 39-2, producing a dark display. On the contrary, when a voltage of the polarity opposite to the charged polarity of the white charged particles 39-1 scattered in the insulating liquid 8 is applied to the first electrode 3, the black charged particles 39-2 are attracted to the second electrode 4 and the white charged particles 39-1 are attracted to the first electrode 3, and therefore the light incident on the pixel is reflected by the Al electrode and further scattered by the white charged particles 39-1, thus producing a white bright display.

In this way, unnecessary reflected light which leaks from the gap between the first electrode 3 and second electrode 4 can be mostly intercepted by the colored layer 35, and therefore it is possible to reduce the black reflective factor and obtain a display with high contrast. Moreover, this is a process capable of forming a light reflecting layer in a narrow gap of only 5 µm between the first electrode 3 and second electrode 4 without any need for difficult positioning control, and therefore it is possible to drastically improve yield.

Example 6

Figure 7:
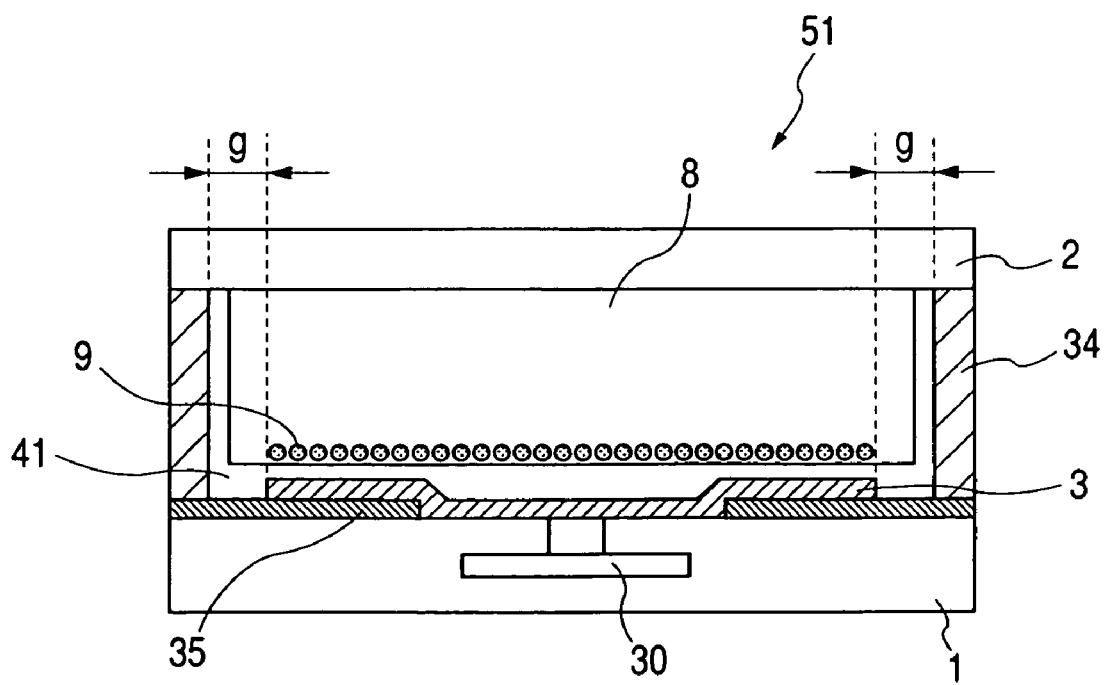
FIG. 7 is a cross-sectional view showing a still further example of the structure of the electrophoresis display apparatus according to the present invention.

In the present example, the electrophoresis display apparatus shown in FIG. 7 will be explained.

Suppose the display apparatus to be created has 200×200 pixels and one pixel is a square of 100 µm per side. Each pixel is surrounded by a second electrode 4 also serving as a support member 6. The second electrode 4 has a height of 20 µm and this distance corresponds to the cell gap. Furthermore, the second electrode 4 has a width of 5 µm.

A colored layer 35 is placed on a back substrate 1 and a first electrode 3 is connected to a TFT (abbreviation of Thin Film Transistor) which is a switching element 30 through a through hole provided in the central area of the pixel. Furthermore, in order to prevent charged particles 39 and an insulating liquid 8 from provoking electrode reaction or charge injection, etc., causing the behavior of the charged particles 39 to change to substantially an instable condition with time, an insulating color filter 41 is laminated on the first electrode 3 and second electrode 4. Furthermore, a transparent insulating liquid 8 in which black charged particles 39 of a predetermined density are scattered is stably enclosed in a closed space surrounded by the back substrate 1, front substrate 2 and support member 6.

Then, the method of manufacturing the electrophoresis display apparatus according to the present example will be explained below.

A glass substrate having a thickness of 0.8 mm is used for the back substrate 1, which is the lower substrate in the figure and an a-Si TFT is formed thereon. The colored layer 35 is patterned on the a-Si TFT using photosensitive resin containing carbon. A convex structure is formed on the area peripheral to the pixel and the first electrode 3 and second electrode 4 are formed simultaneously using Al. The gap g between the two electrodes is set to 5 µm and the electrodes are superimposed on the colored layer 35 in which the gap is formed beforehand. Then, the color filter, which is the insulating layer 41, is patterned so as to cover the first electrode 3 and second electrode 4. Using three adjacent pixels as one set, a CMY color filter is patterned on the respective three pixels. Then, the space partitioned by the second electrode 4, which also serves as the support member, is filled with the insulating liquid 8 in which black charged particles 39 are scattered. Polystyrene-polystyrene methacrylate copolymer resin containing carbon black having a particle diameter of 1 to 3 µm is used for the black charged particles 39-2. Furthermore, isopar (Exxon) is used for the insulating liquid 8 and imide succinate is included therein as a charge control agent. Then, using the front substrate 2, the closed space surrounded by the back substrate 1, front substrate 2 and first electrode 3 which also serves as the support member is sealed with the insulating liquid 8 in which the black charged particles 3 are scattered.

In the reflective electrophoresis display apparatus 51 created using the above-described method, when a voltage of the same polarity as the charged polarity of the charged particles 9 scattered in the insulating liquid 8 is applied to the first electrode 3, the charged particles 9 are attracted to the second electrode 4, producing a bright display. For example, when the color filter placed in this pixel is yellow (Y), the yellow color is displayed. On the contrary, when a voltage of the polarity opposite to the charged polarity of the charged particles 39 scattered in the insulating liquid 8 is applied to the first electrode 3, the charged particles 39 are attracted to the first electrode 3, producing a dark display in the same black color as the color of the charged particles.

In this way, unnecessary reflected light which leaks from the gap between the first electrode 3 and second electrode 4 can be mostly intercepted by the colored layer 35, and therefore it is possible to reduce the black reflective factor and obtain a display with high contrast. Moreover, this is a process capable of forming the light-reflecting layer 35 in a narrow gap of only 5 µm between the first electrode 3 and second electrode 4 without any need for difficult positioning control, and therefore it is possible to drastically improve yield. Furthermore, it is possible to suppress a mixture of leaked light from the adjacent pixels and thereby provide a bright color display.

As shown above, the moving particle type display apparatus according to the present invention can prevent unnecessary reflected light from within the pixels. More specifically, of the first electrode area, the area adjacent to the second electrode is colored in substantially the same color as the color (first color) of charged particles. Therefore, when the charged particles are attracted to the first electrode, even if the density of the charged particles in the area is low (compared to the density of charged particles in the rest of the first electrode area), the color seen from the gaps of the charged particles is only substantially the same color as the first color and the low density of the charged particles is hardly visually recognized and it is possible to thereby prevent the display quality from deteriorating. Furthermore, it is possible to suppress leaked light from between the electrodes and thereby improve the display contrast. Furthermore, depending on the display mode, there is no interference of leaked light from the adjacent pixels, which allows a bright display. Furthermore, this colored layer can be placed through a simple process, and therefore it is possible to improve the yield of manufacturing and reduce cost because there are fewer restrictions on the manufacturing apparatus and materials.

The invention claimed is:

1. An electrophoresis display apparatus comprising:
a first substrate and second substrate arranged with a predetermined gap in between;
an insulating liquid and a plurality of charged particles enclosed in the gap between said first and second substrates, providing a pixel;
a first electrode placed along said first substrate and having a first electrode display area over a relatively wide area of the pixel; and
a second electrode having a voltage applied therebetween and said first electrode, said electrophoresis display apparatus carrying out a display by applying a voltage to these electrodes and moving said charged particles, wherein
said first electrode borders said second electrode at a border portion,
said charged particles are colored in a color,
a colored layer having the same color as the charged particles is formed in the area of said second electrode and the border portion, with said colored layer covering part of said first electrode display area of said first electrode, and
wherein the first electrode display area covers the colored layer and an area of said first electrode uncovered by said colored layer.

2. The electrophoresis display apparatus according to claim 1, wherein a support member is placed between said first substrate and said second substrate so as to partition pixels of the display apparatus.

3. The electrophoresis display apparatus according to claim 2, wherein said second electrode is provided on said support member.

4. The electrophoresis display apparatus according to claim 2, wherein said second electrode is placed between said support member and said second substrate.

5. The electrophoresis display apparatus according to claim 1, wherein the border portion is a strip-shaped portion.

6. The electrophoresis display apparatus according to claim 1, wherein the colored layer colors the second electrode and the border portion in the same color as the charged particles.

* * * * *